Figure 1:
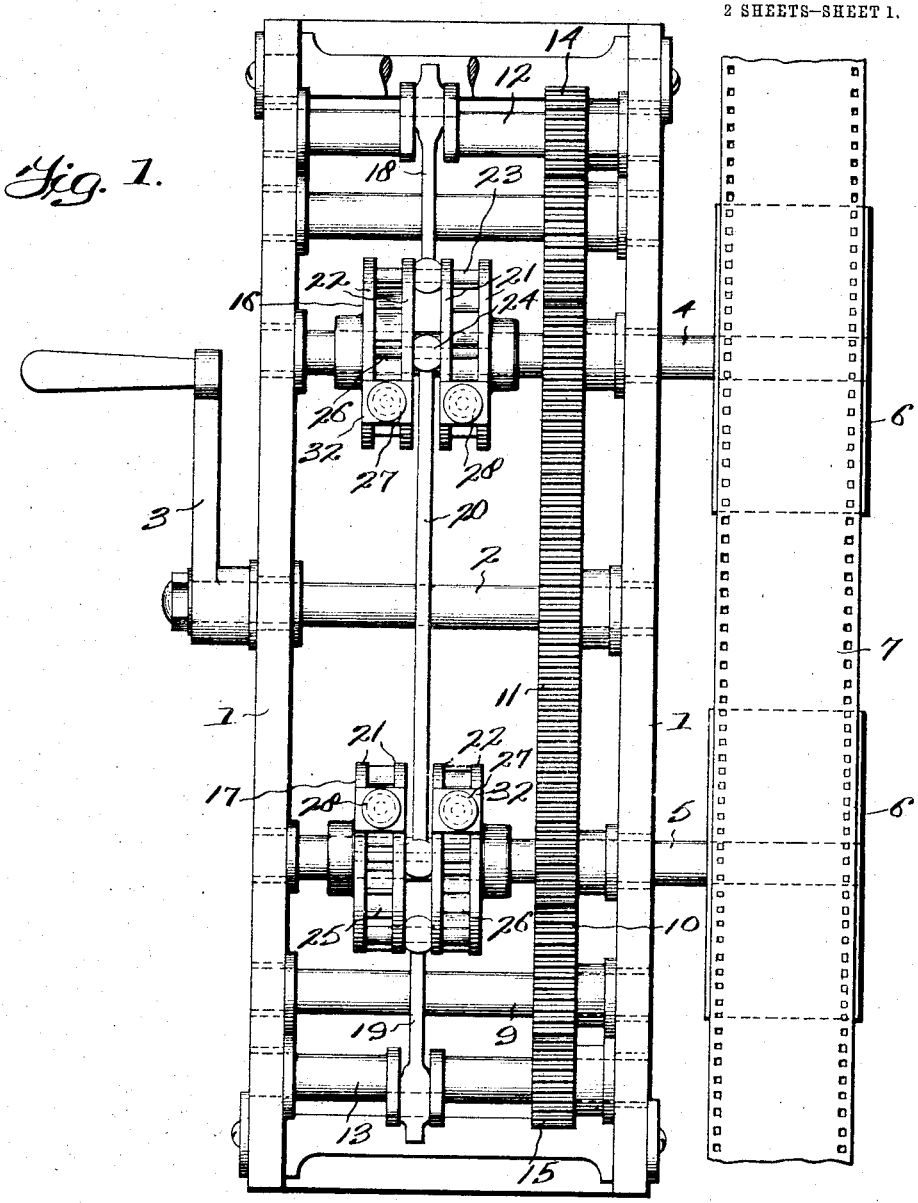

F. E. STILLINGS.
FILM FEEDING MACHINE.
APPLICATION FILED MAY 6, 1913.

1,083,227.

Patented Dec. 30, 1913.
2 SHEETS—SHEET 1.

Witnesses
Edwin J. Beller
N. H. Byrne

Frank E. Stillings, Inventor
by Wilkinson, Giusta & Mackaye
Attorneys

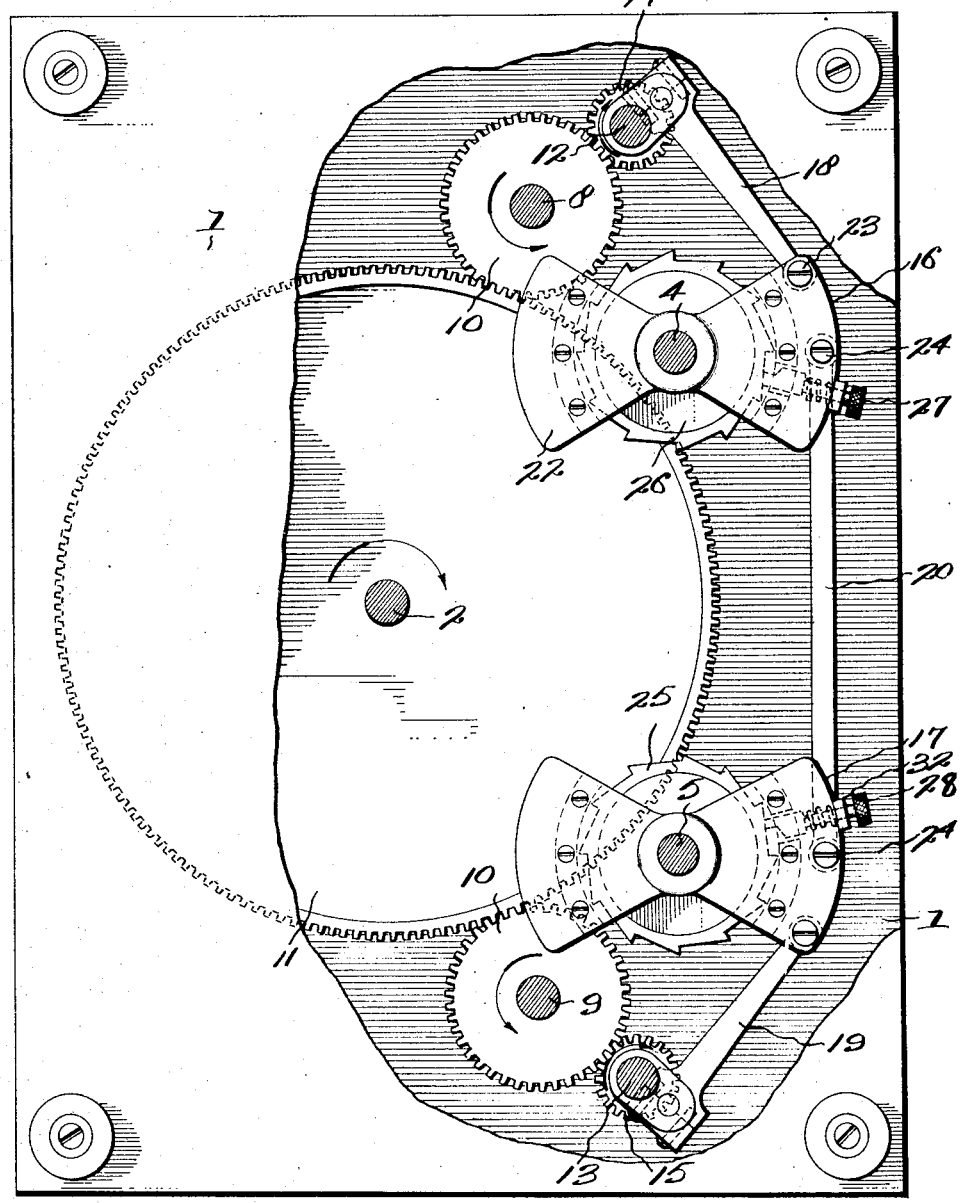

UNITED STATES PATENT OFFICE.

FRANKLIN E. STILLINGS, OF EL PASO, TEXAS, ASSIGNOR OF ONE-THIRD TO MEARLE J. GREEN AND ONE-THIRD TO JAMES ARCHIBALD ALEXANDER, OF EL PASO, TEXAS.

FILM-FEEDING MACHINE.

1,083,227. Specification of Letters Patent. Patented Dec. 30, 1913.

Application filed May 6, 1913. Serial No. 765,942.

*To all whom it may concern:*

Be it known that I, FRANKLIN E. STILLINGS, a citizen of the United States, residing at El Paso, in the county of El Paso and State of Texas, have invented certain new and useful Improvements in Film-Feeding Machines; and I do hereby declare the following to be a full, clear, and exact description of the invention, such as will enable others skilled in the art to which it appertains to make and use the same.

The present invention relates to film feeding mechanism for cameras of the moving picture type, and has for its purpose to provide a machine having means wherein the feeding of the film may be changed to operate in the reverse direction, to the end of obtaining "vision scenes" in the moving pictures reproduced by the projecting machine.

The invention has for its further purpose to provide a film feeding machine wherein the change to feed the film in the reverse direction may be effected in a quick and convenient manner and in which both the forward and reverse feed of the film are produced by one and the same means, and with the actuating member thereof operating in the same direction.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a front elevational view of the machine; Fig. 2 is a side elevational view thereof, the casing being broken away to show the mechanism more clearly; and Fig. 3 is a detail perspective view, partly in section, of one of the ratchet pawls.

Referring to the construction in detail, the machine consists of a casing or frame 1 having a shaft 2 journaled therein and adapted to be rotated by the crank 3. A pair of shafts 4 and 5 are mounted on the casing and are provided, each with a film engaging roller 6 for the film 7 as in the ordinary manner. The pair of film feeding rollers 6 is adapted to be rotated simultaneously and intermittently in either direction for unwinding or rewinding the film, as will be now explained.

A pair of counter shafts 8 and 9 is journaled in the frame 1 and have each a pinion 10 meshing with a driving pinion 11 mounted on the shaft 2; and a pair of crank shafts 12 and 13 journaled in the casing have pinions 14 and 15 respectively, meshing with the pinions 10 and are driven thereby. The two crank shafts 12 and 13 are connected to operate simultaneously two oscillating members 16 and 17, journaled on the shafts 4 and 5, by means of crank arms 18 and 19 connecting said crank shafts with said oscillating members as in the manner shown; and a link 20 connects said oscillating members. Each of said oscillating members consists of two pairs of plates 21 and 22 arranged in spaced relation and held assembled through the medium of pins 23 and 24 to which are connected the crank shaft arms 18 and 19 and the link 20.

A pair of ratchet wheels 25 and 26 is mounted between the plates 21 and 22 on each of the shafts 4 and 5, and each pair of said ratchet wheels is mounted in relatively reversed relation. A pair of pawls 27 and 28 is mounted on each oscillating arm, and arranged one pawl for each ratchet wheel to the end of operating the shaft 4 in either direction desired. The four pawls (27 and 28) and ratchets (25 and 26) are disposed in diagonal arrangement to the end that the film engaging rollers 6 are both positively operated and with the same speed accordingly as the film is to be fed in forward or reverse direction.

When one diagonal pair of pawls and ratchets are in coöperation, the other diagonal pair will be held in inoperative relation, and for this purpose each pawl is carried by a bolt 29 having a threaded portion 30 adapted to screw engage with threads 31 formed on the pawl supporting piece 32. The pawl is withheld in inoperative position by withdrawing the same against the tension of the spring 33 and screwing the bolt to engage with the pawl support 32.

The relative proportions of the several co-operating gears, and connecting mechanism is such as to obtain the necessary sixteen exposures per second, the periods of obscurity being obtained by the idle movements of the ratchet engaging pawls, but inasmuch as this phase of the operation of the machine does not constitute an essential feature of the invention, the precise details of the gearing will not be further described.

It will therefore be seen that the present machine will make positive engagement with the film both at the feed and take up sides of the lens, whether the film be moving in forward or reverse direction, thus avoiding uneven strains, and thereby minimizing the cause of the film breaking. And, it will be furthermore noted that the film may be moved in either direction at a moment's notice, and yet allow the operator to turn the crank constantly in the same direction, thereby eliminating errors, forgetting counts, etc., which are likely to occur in making changes when more time is required for effecting the reverse feed of the film. Thus, in the present manner of reversing the film, it is necessary that an accurate account be made of the revolutions of the hand turning crank in order that the film may be begun at the proper point for the regular full exposures, but by the present machine this counting of the reverse rotations of the hand crank need not be done, and consequently the liability of error is obviated.

It is obvious that those skilled in the art may vary the details of construction and arrangement of parts without departing from the spirit of my invention, and therefore, I do not wish to be limited to the above disclosures except as may be required by the claims.

What I claim is:—

1. In a machine of the character described, the combination of a casing; film engaging rollers mounted on the casing; an intermittently actuated device for each roller adapted to feed the film in one direction; an intermittently actuated device for each roller adapted to feed the film in the opposite direction; and a common means for operating said film feeding devices.

2. In a machine of the character described, the combination of a casing; film engaging rollers mounted on the casing; a pawl and ratchet device for each of said film engaging rollers for operating the same in one direction; driving mechanism for said pawls and ratchets; and a second pawl and ratchet device for each of said film engaging rollers operable through said driving mechanism for feeding the film in the reverse direction.

3. In a machine of the character described, the combination of a casing; film engaging rollers mounted on the casing; ratchet wheels connected to said rollers; pawls for actuating said ratchet wheels; pawl carrying members; crank shafts journaled on the casing; arms connecting the crank shafts to actuate the pawl carrying members for feeding the film in one direction; second ratchet wheels connected to said rollers; pawls mounted on said pawl carrying members for actuating said second ratchet wheels to feed the film in reverse direction; and driving mechanism for said crank shafts.

4. In a machine of the character described, the combination of a casing; film engaging rollers mounted on the casing; ratchet wheels connected to said rollers; oscillating members mounted adjacent the ratchet wheels; pawls carried by said oscillating members for actuating said ratchets to feed the film; a link connecting said oscillating members; crank shafts journaled on the casing; crank arms connecting said crank shafts and said oscillating members; and a gearing for operating said crank shafts.

5. In a machine of the character described, the combination of a casing; film engaging rollers mounted on the casing; ratchet wheels connected to said rollers; oscillating members mounted adjacent the ratchet wheels; pawls carried by said oscillating members for actuating said ratchets to feed the film; a link connecting said oscillating members; second ratchet wheels connected to said film rollers; second pawls carried by said oscillating members for actuating said second ratchet wheels to reverse feed the film; crank shafts journaled on the casing; crank arms connecting said crank shafts and said oscillating members; and a gearing for operating said crank shafts.

6. In a machine of the character described, the combination of a casing; shafts journaled on the casing; film engaging rollers mounted on said shafts; a pair of oppositely disposed ratchet wheels mounted on said shafts; members mounted to oscillate on said shafts adjacent said ratchets; pawls carried by said oscillating members and adapted to engage with their respective ratchets to operate the shafts intermittently in either direction; a link connecting said oscillating members; crank shafts journaled on the casing; arms connecting said crank shafts with said oscillating members; and driving means for said crank shafts.

7. In a machine of the character described, the combination of a casing; shafts journaled on the casing; film engaging rollers mounted on said shafts; a pair of oppositely disposed ratchet wheels mounted on each of said shafts; members mounted to oscillate on said shafts adjacent each pair of said ratchets; a pair of pawls carried by each of said oscillating members and adapted, one of each respective pair, to engage with their corresponding pair of ratchets for moving said ratchets in one direction; means for withdrawing and securing in inoperative position one pair of said pawls when the other pair thereof is operating; and driving means for said oscillating members.

In testimony whereof, I affix my signature, in presence of two witnesses.

FRANKLIN E. STILLINGS.

Witnesses:
R. S. WALKER,
T. E. ATWATER.

Copies of this patent may be obtained for five cents each, by addressing the "Commissioner of Patents, Washington, D. C."